No. 816,149. PATENTED MAR. 27, 1906.
R. S. BRYANT.
VEHICLE WHEEL.
APPLICATION FILED MAR. 23, 1905.

WITNESSES:
Carl Stoughton

INVENTOR
Richard S. Bryant,
BY
ATTORNEYS

UNITED STATES PATENT OFFICE.

RICHARD S. BRYANT, OF COLUMBUS, OHIO.

VEHICLE-WHEEL.

No. 816,149.　　　Specification of Letters Patent.　　Patented March 27, 1906.

Application filed March 23, 1905. Serial No. 251,548.

*To all whom it may concern:*

Be it known that I, RICHARD S. BRYANT, a citizen of the United States, residing at Columbus, in the county of Franklin and State of Ohio, have invented certain new and useful Improvements in Vehicle-Wheels, of which the following is a specification.

My invention relates to a new and useful improvement in vehicle-wheels.

The object of the invention is to provide an improved sectional or built-up wheel structure which while useful in many applications is particularly adapted for use in connection with pneumatic and cushioned tires and for application to motor-vehicles.

It is furthermore designed to produce the wheel from sheet metal which is stamped, cut, or otherwise formed into the several sections of the wheel and the coöperating sections brazed, so as to be strongly, durably, and rigidly connected in an efficient manner.

A still further object resides in so disposing and connecting the inner spoke members and the wheel generally as to obviate the necessity of forming the said spoke members with heads or portions extending from the wings of the outer spoke members to the hub-opening, as in my Patent No. 734,254, issued July 21, 1903, and my allowed application, filed November 7, 1904, and bearing Serial No. 231,712.

Finally, the object of the invention is to provide a device of the character described that will be strong, durable, and efficient, simple and comparatively inexpensive to make, and one in which the several parts will not be liable to get out of working order.

With the above and other objects in view the invention consists of the novel details of construction and operation, a preferable embodiment of which is described in the specification and illustrated in the accompanying drawings, wherein—

Figure 1:
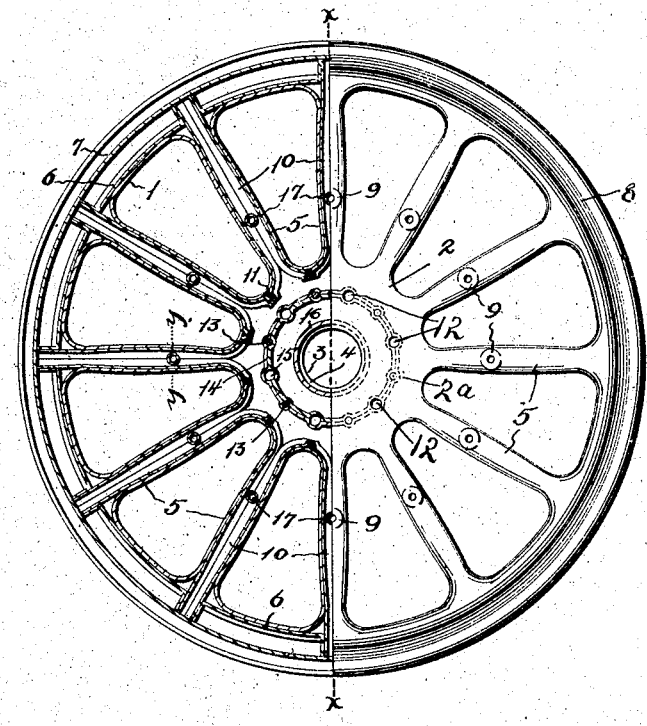
Figure 2:
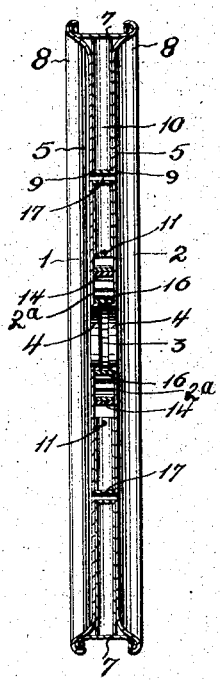
Figure 3:
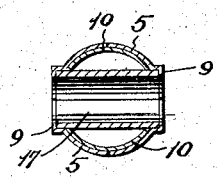

Figure 1 is a side view showing one half of the wheel in elevation and the other half in vertical section. Fig. 2 is a transverse vertical sectional view taken on the line $x\ x$ of Fig. 1. Fig. 3 is a transverse vertical sectional view through one of the spokes, taken on the line $y\ y$ of Fig. 1; and Fig. 4 is a view of a portion of one of the spokes and shows the bosses in end elevation.

As hereinbefore indicated, it is an important feature of this invention to form the wheel of sheet metal, and in carrying out this object the wheel comprises duplicate half-sections 1 and 2, respectively. Therefore a description of one section will suffice for both sections. Each section has a flat central portion $2^a$, provided with a circular opening 3, which is formed by an inturned and laterally-extending flange 4 for the reception of the hub. (Not shown, as the hub feature forms no part of the present invention.) From the central portion 1 outer spoke members 5 radiate, said spokes being pressed, stamped, or otherwise formed into substantially semicircular or semi-elliptical shape, as best indicated in Fig. 3 of the drawings, with the concaved face of the spoke at the outer side of the wheel-section. Each section is bowed or bulged outwardly at 8 to give it a semi-elliptical shape in cross-section. As shown in Fig. 2 of the drawings, it will be noted that the rim portion 8 is disposed at the outer side of the plane of the central portion of the wheel-section and the spokes are disposed at the opposite or inner side of the section, so that when the opposite wheel-sections are brought together, with the edges of corresponding spoke members in mutual engagement, the free edges of the bowed portions 8 are separated by an annular interspace. This construction just referred to is fully described and illustrated in my allowed application filed November 7, 1904, and bearing Serial No. 231,712.

Figure 4:
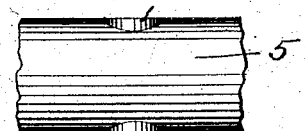

Before assembling the opposite wheel-sections the outer spoke members 5 of each section are formed in their bottoms or outer sides with apertured bosses 9, which latter are flat on their inner and outer surfaces, as will be apparent from Figs. 3 and 4 of the drawings, and it will be apparent that the outer faces of the bosses of each spoke will lie in the same plane, so that a sprocket or other driving gear may be securely bolted to the spokes. It is to be understood that while I have shown the bosses 9 formed in each spoke member they might be formed in every other spoke member or eliminated from certain spoke members, as the circumstances may require. Prior to bringing the said opposite wheel-sections together inner tubular sheet-metal spoke members 10 are snugly fitted in the outer spoke members 5 of one of the wheel-sections, said inner spoke members being shaped to correspond with the said outer members. Each inner spoke member has its inner end curved and bent around the inner end of the outer spoke member toward and contacting with the like-formed adjacent inner spoke member of the next adjacent outer spoke member, as clearly shown in Fig. 1. The meeting ends of the opposite inner spoke members are riveted together, as indicated at 11, so as to hold the same in position. The central flat portion 2ᵃ of each wheel-section is formed between the inturned flange 4 and the ends of the spoke members with a circular row of openings 12, between which extend small bolts 13, which pass through a reinforcing-ring 14, having enlarged openings 15, registering with the openings 12 and formed therebetween to receive the said bolts 13. A collar 16 is engaged about the lateral flange 4 and is adapted to receive the opposite flange 4 when the sections are brought together.

The inner spoke members 10 are each cut away about the bosses 9, so as to receive short sleeves 17, which snugly rest within the bosses 9, as more clearly illustrated in Fig. 3. From this it will be apparent that a continuous passage through each spoke of the wheel for the fastening-bolts of the sprockets or their gears is provided and that each spoke is also transversely reinforced.

The outer ends of the inner spoke members 10 project beyond the outer spoke members and are rigidly secured together by curved stretcher-pieces 6, which have their ends upturned, so as to firmly engage the ends of the spokes. Between the rim portions 8 of the wheel-sections a substantially U-shaped supplemental rim member 7 is snugly fitted, so as to bridge the interval between the said rim portions, and this supplemental rim rests on the outer ends of the inner spoke members. This construction is substantially the same as shown and described in my former application hereinbefore referred to. All the meeting edges of the parts are brazed together, so as to form a strong, rigid, durable, and water-tight joint between the sections and the parts, and thereby to obviate the employment of separate fastenings which are liable to break and work loose, thus rendering the wheel objectionable and unserviceable, it being understood that the rivets 11 and the bolts 13 are employed more especially for holding the parts in position while the sections are being assembled and are not relied upon as fastening means with respect to the completed wheel.

As in my former application, the inner and outer spokes are arranged to break joint, as will be apparent from an observation of Fig. 1.

I do not wish to limit myself to the exact details of construction and operation herein described, as I may make various changes in the same wholly within the scope of the claims and without departing from the spirit of the invention.

Having now fully described my invention, what I claim, and desire to secure by Letters Patent, is—

1. A wheel comprising opposite sections adapted to be secured together having integral semitubular spokes and rim portions, bosses pressed in one or more of the semitubular spokes, reinforcing means confined within the spokes between the bosses, and inner spoke members disposed within the outer spokes.

2. A wheel composed of opposite half-sections adapted to be secured together, each section being formed of sheet metal and provided with integral semitubular outer spokes and a central opening, a flange formed about the opening in each section, brazing means connecting the flanges, inner spoke members arranged in the outer spoke members having their inner ends secured together and terminating short of the flanges so as to provide a substantial space, and independent reinforcing means arranged in the space between the sections.

3. A wheel comprising opposite sections adapted to be secured together having semitubular outer spokes and rim portions formed integral with each other, bosses pressed in one or more of the outer spokes, tubular reinforcing means confined within the outer spoke members between the bosses, and inner spoke members disposed within the outer spoke members.

4. The combination with the opposite half-sections of a wheel and the inner and outer spoke members thereof, of independent transverse reinforcing means arranged about the central portion of the wheel, and means for holding the said reinforcing means in position passing through the same.

5. The combination with a wheel comprising opposite half-sections adapted to be brazed together, each formed with outer spoke members, a rim portion and a central opening with an annular flange extending about the opening, and inner spoke members, of transverse spoke-reinforcing means, transverse reinforcing means arranged between the inner spoke members and the flanges but separated therefrom, and transverse bracing means connecting the flanges.

6. The combination with a wheel comprising opposite half-sections adapted to be brazed together each formed with outer spokes, a rim portion formed integral with the spokes and a central opening with an annular flange extending about the opening, of inner spoke members arranged within the outer spokes, the inner spoke members of adjacent outer spokes being secured together at their inner ends, and an internal reinforcing-ring extending from one section to the other between the inner ends of the inner spoke members and the flanges but independent thereof.

In testimony whereof I affix my signature in presence of two witnesses.

RICHARD S. BRYANT.

Witnesses:
A. L. PHELPS,
M. B. SCHLEY.